(12) United States Patent
Heffner et al.

(10) Patent No.: US 12,270,585 B2
(45) Date of Patent: Apr. 8, 2025

(54) DOME-LOADED BACK PRESSURE REGULATOR WITH SETPOINT PRESSURE ENERGIZED BY PROCESS FLUID

(71) Applicant: Equilibar, LLC, Fletcher, NC (US)

(72) Inventors: Ryan Matthew Heffner, Asheville, NC (US); Eugene Charles Jansen, Stafford, VA (US); Jeffrey Dean Jennings, Hendersonville, NC (US)

(73) Assignee: Equilibar, LLC, Fletcher, NC (US)

( * ) Notice: Subject to any disclaimer, the term of this patent is extended or adjusted under 35 U.S.C. 154(b) by 77 days.

(21) Appl. No.: 17/486,075

(22) Filed: Sep. 27, 2021

(65) Prior Publication Data

US 2022/0011030 A1  Jan. 13, 2022

Related U.S. Application Data

(62) Division of application No. 15/976,495, filed on May 10, 2018, now Pat. No. 11,193,703.

(Continued)

(51) Int. Cl.
*F25B 49/02* (2006.01)
*F16K 7/12* (2006.01)
*F25B 41/22* (2021.01)

(52) U.S. Cl.
CPC ............... *F25B 49/02* (2013.01); *F16K 7/12* (2013.01); *F25B 41/22* (2021.01); *F25B 2500/07* (2013.01)

(58) Field of Classification Search
CPC ...... F25B 49/02; F25B 41/22; F25B 2500/07; F25B 9/008; F25B 2309/061; F25B 2600/2503; F25B 2600/2509; F25B 2700/195; F25B 2700/197; F25B 2700/2116; F25B 2700/2117; F25B 41/20;

(Continued)

(56) References Cited

U.S. PATENT DOCUMENTS

| | | | | |
|---|---|---|---|---|
| 1,350,550 A | * | 8/1920 | Hoffman | F25B 49/02 62/200 |
| 1,917,045 A | * | 7/1933 | Marshall | F25B 49/02 236/92 R |

(Continued)

FOREIGN PATENT DOCUMENTS

WO   WO-2012178132 A1 * 12/2012 ............... F16K 7/17

*Primary Examiner* — Eric S Ruppert
*Assistant Examiner* — Kirstin U Oswald
(74) *Attorney, Agent, or Firm* — Shumaker, Loop & Kendrick, LLP; Jonathan M. Hines

(57) ABSTRACT

A diaphragm pressure regulator includes: a body defining a process surface and including: an exhaust port having a discharge opening, and at least one vent void interconnecting the process surface and the exhaust port; and an inlet port, and at least one process void communicating with the process surface and the inlet port; a reference housing including a cavity defining a reference surface and a reference port in fluid communication with the cavity; and a diaphragm disposed between the body and the reference housing, the diaphragm movable between a first position engaged with the vent voids, and a second position wherein the membrane is not engaged with at least one of the vent voids, wherein a dome is defined between the cavity and the reference side of the diaphragm; and wherein the reference housing includes a sump configured to segregate liquid from the reference side of the diaphragm.

16 Claims, 9 Drawing Sheets

Related U.S. Application Data

(60) Provisional application No. 62/648,624, filed on Mar. 27, 2018, provisional application No. 62/504,274, filed on May 10, 2017.

(58) Field of Classification Search
CPC . F25B 49/027; F16K 7/12; F16K 7/17; F16K 31/1266
USPC .......................................................... 62/117
See application file for complete search history.

(56) References Cited

U.S. PATENT DOCUMENTS

| | | | |
|---|---|---|---|
| 2,161,312 A | 6/1936 | Pritchard | |
| 2,148,413 A | 2/1939 | Labberton et al. | |
| 2,165,741 A * | 7/1939 | Wolfert | F25B 31/00 62/196.3 |
| 2,196,778 A * | 4/1940 | Dodge | F25B 41/335 62/211 |
| 2,214,236 A * | 9/1940 | Seldon | F25B 5/02 236/98 |
| 2,290,013 A | 7/1942 | Barnett | |
| 2,401,144 A | 5/1946 | Dube | |
| 2,538,861 A * | 1/1951 | Carter | F25B 41/335 62/211 |
| 2,577,902 A * | 12/1951 | McGrath | F25B 41/335 236/99 D |
| 2,959,352 A * | 11/1960 | Cunningham | H05B 1/02 137/489.5 |
| 3,145,543 A * | 8/1964 | Miner | F25B 49/027 62/509 |
| 3,264,837 A * | 8/1966 | Harnish | F25B 41/335 62/503 |
| 3,264,839 A * | 8/1966 | Harnish | F25B 41/385 165/263 |
| 3,303,664 A * | 2/1967 | Hansen | F25B 41/20 62/197 |
| 3,313,121 A * | 4/1967 | Barbier | F25B 41/20 62/197 |
| 3,333,436 A * | 8/1967 | Johnson | C02F 1/22 137/262 |
| 3,435,626 A * | 4/1969 | Wile | F25B 41/24 251/28 |
| 3,635,442 A | 1/1972 | Ulbing | |
| 3,972,654 A | 8/1976 | Clayton et al. | |
| 4,006,602 A | 2/1977 | Fanberg | |
| 4,297,998 A | 11/1981 | Christianson | |
| 4,648,553 A | 3/1987 | Muller | |
| 4,934,156 A | 6/1990 | Barbier | |
| 5,070,707 A | 12/1991 | Ni | |
| 5,271,601 A | 12/1993 | Binzer et al. | |
| 5,881,765 A * | 3/1999 | Turney | G05D 16/0658 137/484.4 |
| 2008/0258098 A1 | 10/2008 | Hawkins | |
| 2011/0048042 A1 | 3/2011 | Chen et al. | |
| 2013/0000756 A1 | 1/2013 | Griffin, Jr. et al. | |
| 2014/0203198 A1* | 7/2014 | Jennings | G05D 16/0655 251/61.1 |
| 2016/0279376 A1* | 9/2016 | Cewers | A61M 16/206 |

* cited by examiner

DOME-LOADED BACK PRESSURE REGULATOR WITH SETPOINT PRESSURE ENERGIZED BY PROCESS FLUID

CROSS-REFERENCE TO RELATED APPLICATIONS

This application is a Divisional of U.S. patent application Ser. No. 15/976,495 filed May 10, 2018, currently pending, which claims the benefit of provisional patent application 62/504,274 filed May 10, 2017, and which claims the benefit of provisional patent application 62/648,624 filed Mar. 27, 2018. Each of these applications is incorporated by reference herein.

BACKGROUND OF THE INVENTION

The present invention relates to pressure regulation in fluid systems, and more particularly to pressure regulation for heat exchangers in thermal systems.

Refrigeration systems typically use a thermal expansion valve ("TXV") or similar variable flow restrictor to control the mass flow rate of refrigerant through the system. This device typically matches the flow rate to the thermal demand by controlling using temperature feedback the temperature, or degree of superheat coming out of the evaporator coil. Typically, the degree superheat target is sufficiently far away from the vapor-dome line to ensure that the fluid quality entering the compressor is vapor, along with ensuring full utilization of the heat exchanger's size to boil the refrigerant. Every degree of superheat in the system represents evaporator and consequently system inefficiency, so the trade-off between ensuring vapor at the outlet and maximizing system performance balancing system mass flow results in competing control conditions. While this works well for many types of systems, there are a number of dependent variables that prevent explicit control for high performance systems or highly efficient systems. Because the pressure is not explicitly controlled, it is necessary to control the TXV with a significant amount of superheat above saturation This is also necessary because any small fluctuating load varies the fluid quality at the outlet of the evaporator. If the TXV controlled close to the vapor dome, there is a strong possibility that the fluid drops into the dome, creating partial liquid. Since liquid is undesirable for the compressor inlet and the TXV can't keep up with the small fast changing heat loads, the extra superheat is needed. While it desirable to control the evaporator exit near the saturated dome for efficiency sake, it is dangerous to operate close to the dome in practice because of the risk of damaging the compressor by allowing liquid droplets to be ingested.

There are various types of prior art upstream evaporator (or heat exchanger) pressure controlling valves; a common feature of traditional evaporator pressure control valves is the use of springs in some fashion to assist with diaphragm opening or valve stem/seats to reduce hysteresis or use springs themselves to assist with setpoint generation. This complex fluid routing path offers opportunity for inaccuracy and additional valve authority is required to offer system stability. Valve authority is defined as the ratio of pressure drop (dP) required across a valve compared to overall system dP. This dP for the valve can be on the order of 10 psi dP for some prior art valves. This additional valve authority required by some traditional designs also can cause problems, since the large Joules-Thompson cooling could condense process fluid. To mitigate this, valve designers must balance gross oversizing of traditional valves with valve authority required. Additionally, every unit of valve authority increase decreases overall system efficiency, since increased valve authority represents additional energy required to restore the system back to peak pressure values.

Back pressure regulation (and flow regulation in general) is typically accomplished in the commercial and industrial refrigeration prior art by the means of automated linear control valves. These valves are economical and effective, but typically take more than 10 to 15 seconds to fully react to a change in valve opening command. Some larger refrigeration systems can take up to 30 minutes to fully stabilize after start-up due to the resonant control effects of having multiple linear valves slowly adjusting their flow rate with a dueling effect of multiple control resonances at or near the same frequency.

An alternate type of back pressure regulator is a dome-loaded, direct diaphragm sealing type using multiple orifices, such as those sold by Equilibar, LLC of Fletcher, N.C. These back pressure regulators offer major advantages for controlling thermal systems because they can adapt to a very wide range of flow requirements (well over 1000:1 flow coefficient ratio) in less than 1 second due to the native mechanical force balance of the diaphragm. Such back pressure regulators allow for dramatic times savings for system stabilization due the near instantaneous pressure control (less than 1 second). However, these dome loaded BPRs require a 1:1 dome loaded pilot fluid, which is typically supplied by nitrogen or air into a commercial electropneumatic (E/P) pilot controller. This requirement of a separate gas supply is a major barrier for adoption for users such as commercial or mobile systems development.

Accordingly, there is remains a need for a self-contained apparatus for controlling refrigerant pressure that responds rapidly but requires no external gas supply.

BRIEF SUMMARY OF THE INVENTION

This need is addressed by a back pressure control apparatus for a thermal system wherein a dome-loaded back pressure regulator is controlled by a setpoint pressure, the setpoint pressure being controlled by a mechanical or electrical control system, wherein the fluid supply for the control system is taken from the same process system that the dome-loaded back pressure regulator is controlling, at a point upstream of the dome-loaded back pressure regulator.

According to one aspect of the technology described herein, a diaphragm pressure regulator includes: a body defining a process surface and including: an exhaust port having a discharge opening communicating with an exterior of the body, and at least one vent void interconnecting the process surface and the exhaust port; and an inlet port having an inlet opening communicating with an exterior of the body, and at least one process void communicating with the process surface and the inlet port; a reference housing including a cavity defining a reference surface and a reference port in fluid communication with the cavity and an exterior of the reference housing; and a diaphragm having opposed reference and process sides disposed between the body and the reference housing such that the process side contacts the process surface, the diaphragm movable between a first position engaged with the vent voids, and a second position wherein the membrane is not engaged with at least one of the vent voids, wherein a dome is defined between the cavity and the reference side of the diaphragm;

and wherein the reference housing includes a sump configured to segregate liquid from the reference side of the diaphragm.

BRIEF DESCRIPTION OF THE DRAWINGS

The invention may be best understood by reference to the following description taken in conjunction with the accompanying drawing figures in which.

DETAILED DESCRIPTION OF THE INVENTION

Described herein are several embodiments of a pressure regulating apparatus which includes a dome-loaded direct sealing diaphragm pressure regulator coupled to a pilot pressure regulator, where the pilot pressure regulator uses process fluid to provide reference pressure. This property is referred to herein as the pressure regulating apparatus being "self-contained" or "self-energizing".

Figure 1:
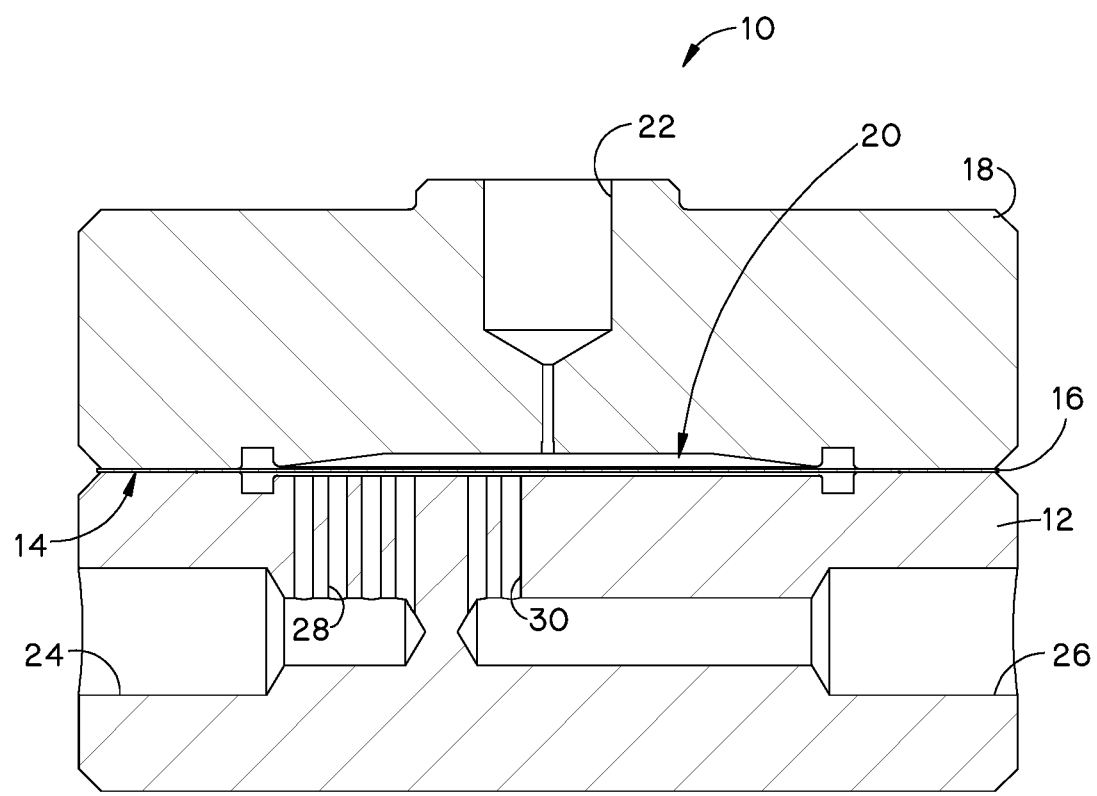
FIG. 1 is a schematic drawing of a prior art dome-loaded diaphragm pressure regulator.

Now, referring to the drawings wherein identical reference numerals denote the same elements throughout the various views, FIG. 1 illustrates an example of a prior art, commercially available pressure regulator 10 of a type referred to as a "dome-loaded, direct diaphragm sealing" type. The pressure regulator 10 includes a body 12 including a process surface 14. A diaphragm 16 made of flexible material such as fiber reinforced PTFE sheeting, or PEEK, or polyimide, is disposed adjacent the process surface 14. The diaphragm 16 has opposed sides referred to as reference and process sides, with the process side facing the process surface 14. The perimeter of the diaphragm 16 is secured against the body 12 by a reference housing 18 which is attached to the body 12. Collectively, a space defined between the diaphragm 16 and the reference housing 18 is referred to as a "dome" 20 of the pressure regulator 10. A reference port 22 is formed in the reference housing 18 and is disposed in fluid communication with the reference side of the diaphragm 16. Inlet and outlet ports 24 and 26 respectively, are also formed in the body 12. At least one process void 28 is disposed in fluid communication with the inlet port 24 and the process surface 14. Optionally, multiple process voids may be provided. At least one vent void 30 is disposed in fluid communication with the outlet port 26 and the process surface 14. Optionally, multiple vent voids may be provided. The voids 28, 30 are small holes or small openings and may also be referred to as orifices herein.

In use, reference port 22 of the pressure regulator 10 is connected to a pressure reference source, the inlet port 24 is connected to a process pressure, and the outlet port 26 is connected to a vent pressure. During normal balanced or modulating mode, the diaphragm 16 is drawn into a sealing relationship with the vent voids 30 due to the pressure differential between the vent pressure and reference pressure. When the process pressure exceeds the reference pressure the area of the diaphragm 16 between the vent voids 30 is persuaded away from the vent voids 30 thereby allowing venting through the outlet port 26.

In practice, the diaphragm 16 blocks the fluid flow to the outlet port 26 until the inlet pressure very slightly increases above the reference pressure. The diaphragm 16 then forms a quick acting mechanical "controller" to maintain a tight pressure balance that can respond in a very short time window, for example less than 100 mS.

Figure 4:
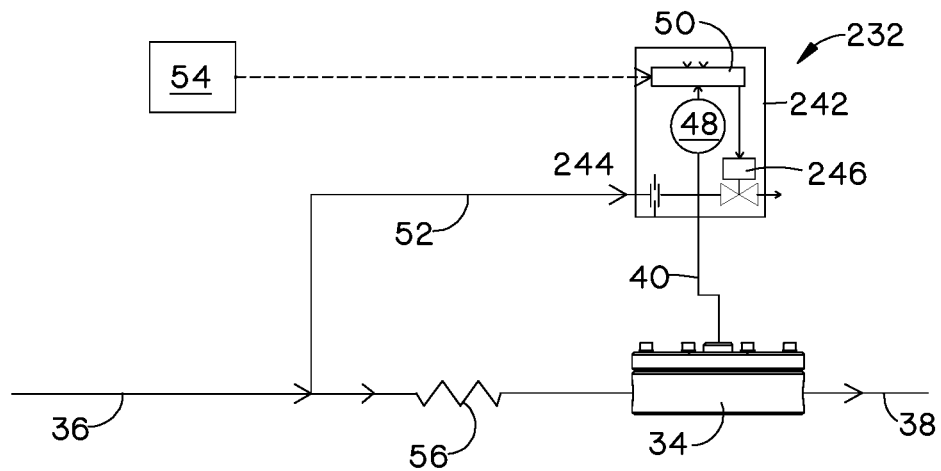
FIG. 4 is a schematic diaphragm of a dome-loaded diaphragm pressure regulator controlled by an electronic pilot pressure regulator having a controllable drain valve.
Figure 3:
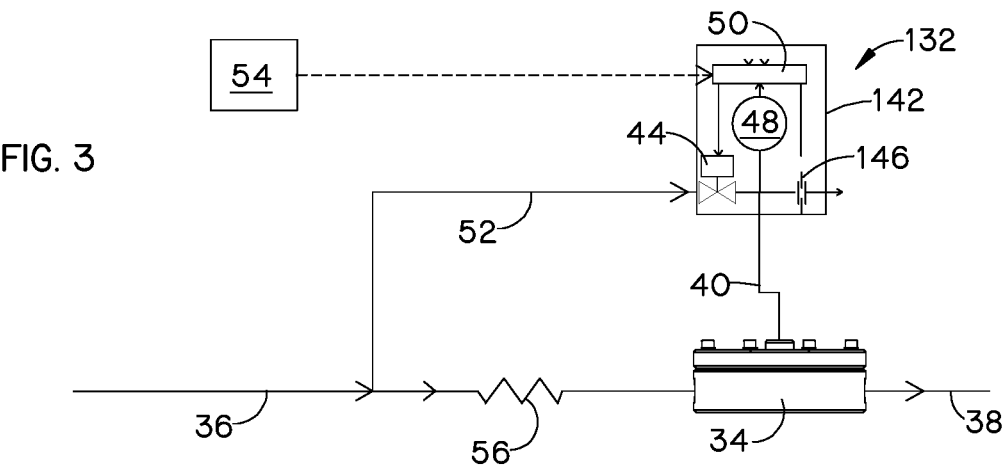
FIG. 3 is a schematic diagram of a dome-loaded diaphragm pressure regulator controlled by an electronic pilot pressure regulator having a controllable fill valve.
Figure 2:
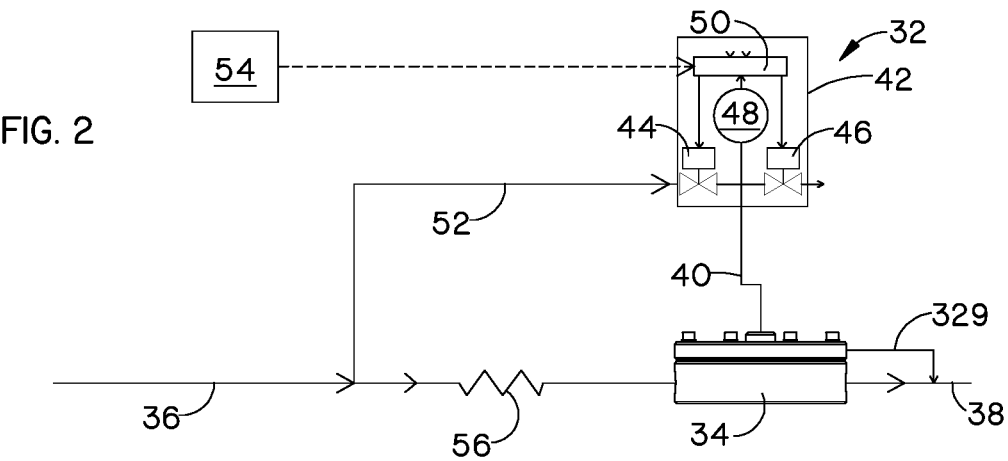
FIG. 2 is a schematic diagram of a dome-loaded diaphragm pressure regulator controlled by an electronic pilot pressure regulator having a controllable fill and drain valves.

In accordance with the principles described herein, the pressure regulator 10 or a derivate of this type may be combined with a pilot regulator in order to provide closed-loop control of process fluid pressure. When a closed-loop electronic controller is included in the pilot regulator, this secondary controller is able to make adjustments to the reference pressure to compensate for friction in the piping and the inlet portion of the dome-loaded back pressure regulator. Typically, this controller action is slower than the native diaphragm action due to the filling time to compress and transport the pilot fluid into the dome. However, reaction times faster than 1 second are possible with this secondary (master) loop. FIGS. 2, 3, and 4 depict three exemplary embodiments of an electronic pilot pressure regulator in combination with a dome-loaded back pressure regulator.

FIG. 2 illustrates a pressure regulating apparatus 32 comprising a main pressure regulator 34 with its inlet port connected to a process line 36 and its outlet port connected to a vent line 38. The vent line 38 can be tied back into the process line downstream of the main pressure regulator 34, to return process fluid to the system, or could be vented to some other vessel or to atmosphere. The main pressure regulator 34 is of the dome-loaded direct sealing diaphragm type as described herein. The reference port of the main pressure regulator 34 is connected by a reference line 40 to a pilot pressure regulator 42, which in this example is an electronic pressure regulator. The pilot pressure regulator 42 includes a fill valve 44, a drain valve 46, and a pressure transducer 48, all of which are operatively coupled to an electronic controller 50. Each of the valves 44, 46 is movable between an open state or position permitting fluid flow therethrough and a closed state or position blocking flow therethrough, under control of the electronic controller 50. For example, the valves 44, 46 may be solenoid-operated valves. Optionally, one or both of the valves 44, 46 may be of a proportional type which can be placed in an intermediate position between the open and closed positions. The pressure transducer 48 is operable to sense fluid pressure and generate a signal representative of the magnitude of the pressure. In some applications, the pressure transducer 48 may be replaced with a remote pressure transducer (not shown) connected so as to sense process pressure in the process line 36. The fill valve 44 is connected in fluid communication to the process line 36 at a point upstream of the main pressure regulator 34, by a tap line 52. The drain valve 46 can be tied back into the process line downstream of the main pressure regulator 34, to return process fluid to the system, or could be vented to some other vessel or to atmosphere. The pilot pressure regulator 42 includes a common internal fluid connection amongst the reference line 40, the fill valve 44, the pressure transducer 48, and the drain valve 46.

Opening of the fill valve 44 permits process fluid to enter the reference line 40 and thus the dome (e.g., dome 20 as shown in FIG. 1) of the main pressure regulator 34. Opening of the drain valve 46 permits fluid to drain from the dome and the reference line 40.

The pilot pressure regulator 42 controls fluid pressure in the reference line 40 to converge to a setpoint value. The feedback loop is implemented by the electronic controller 50, referencing the pressure signal from the pressure transducer 48.

The electronic controller 50 increases the system pressure by allowing fluid flow into the dome of the main pressure regulator 34 by opening the fill valve 44 for a short duration. The electronic controller 50 decreases the system pressure by allowing fluid to drain from the dome by opening the drain valve 46 for a short duration. Binary valve action is highly suitable for this approach, though analog valve action may be obtained by use of pulse width modulation or varying current to the solenoid coil.

Various options are possible for control of the reference pressure in the reference line 40. In one example, the setpoint may be a preset or fixed value programmed into the electronic controller 50. In another example, the setpoint may be variable and may be provided as an external input to the electronic controller 50, such as a variable voltage controlled by a potentiometer or similar device (not shown). In another example, the setpoint may be variable and may be provided as an external input to the electronic controller 50 as part of a second feedback loop which samples a process parameter (e.g., pressure or temperature) via an upstream pressure transducer (not shown). The second feedback loop may be implemented, for example, by a programmed logic controller (PLC) or general-purpose computer with appropriate software. An external setpoint input is represented schematically at box 54 in FIG. 2.

Optionally, a flow restriction, shown schematically at 56 in FIG. 2, may be provided downstream of the connection point of the tap line 52 to the process line 36 and upstream of the inlet of the main pressure regulator 34, so that the pilot pressure regulator 42 can take advantage of a higher pressure supply of process fluid. Non-limiting examples of flow restrictions include a variable orifice, a fixed orifice, a capillary tube, inherent pipe friction, or a spring-loaded check valve.

FIG. 3 illustrates an alternative pressure regulating apparatus 132 comprising a pressure regulator 34 with its inlet port connected to a process line 36 and its outlet port connected to a vent line 38. The reference port of the main pressure regulator 34 is connected by a reference line 40 to a pilot pressure regulator 142, which in this example is an electronic pressure regulator. The pilot pressure regulator 142 is similar in construction to the pilot pressure regulator 42 described above but differs in that it does not include a drain valve. Elements of the pilot pressure regulator 142 not explicitly described may be taken to be identical to those of the pilot pressure regulator 42 described above. The pilot pressure regulator 142 includes a fill valve 44, a calibrated drain orifice 146, and a pressure transducer 48. The fill valve 44 and the pressure transducer 48 are operatively coupled to an electronic controller 50. The fill valve 44 is connected in fluid communication to the process line 36 at a point upstream of the main pressure regulator 34, by a tap line 52. The drain orifice 146 can be tied back into the process line downstream of the main pressure regulator 34, to return process fluid to the system, or could be vented to some other vessel or to atmosphere. The pilot pressure regulator 142 includes a common internal fluid connection amongst the reference line 40, the fill valve 44, the pressure transducer 48, and the drain orifice 146.

In use, the electronic controller 50 increases the system pressure by allowing fluid flow into the dome of the main pressure regulator 34 by opening the fill valve 44. There is a constant bleed rate of fluid from the dome that requires continuous or frequent refilling from the fill valve 44. Analog or PWM fill valves, or highly frequent pulsing of the fill valve (if binary) may be used to offset the continuously bleeding dome fluid. Any of the options for control of the reference pressure setpoint described above with respect to the pressure regulating apparatus 32 may be used with the pressure regulating apparatus 132.

FIG. 4 illustrates another alternative pressure regulating apparatus 232 comprising a main pressure regulator 34 with its inlet port connected to a process line 36 and its outlet port connected to a vent line 38. The reference port of the main pressure regulator 34 is connected by a reference line 40 to a pilot pressure regulator 242, which in this example is an electronic pressure regulator. The pilot pressure regulator 242 is similar in construction to the pilot pressure regulator 42 described above but differs in that it does not include a fill valve. Elements of the pilot pressure regulator 242 not explicitly described may be taken to be identical to those of the pressure regulator 42 described above. The pilot pressure regulator 242 includes a calibrated fill orifice 244, a drain valve 46, and a pressure transducer 48. The drain valve 46 and the pressure transducer 48 are operatively coupled to an electronic controller 50. The fill orifice 144 is connected in fluid communication to the process line 36 at a point upstream of the main pressure regulator 34, by a tap line 52. The drain valve 46 can be tied back into the process line downstream of the main pressure regulator 34, to return process fluid to the system, or could be vented to some other vessel or to atmosphere. The pilot pressure regulator 242 includes a common internal fluid connection amongst the reference line 40, the fill orifice 144, the pressure transducer 48 and the drain valve 46.

The control increases the system pressure by closing the drain valve 46 and allowing liquid flow into the dome of the main pressure regulator 34. There is a constant bleed rate of fluid into the dome that requires continuous or frequent bleeding from the drain valve 46. Analog or pulse width modulated (PWM) or highly frequent pulsing of the drain valve 46 (if binary) is usable to offset the continuously filling dome fluid. Any of the options for control of the reference pressure setpoint described above with respect to the pressure regulating apparatus 32 may be used with the pressure regulating apparatus 232.

To summarize the operation of the pressure regulating apparatus described above, the main pressure regulator 34 will react to incoming refrigerant flow or pressure changes within a short timeframe (e.g., 100 mS) due to the native diaphragm force balance, controlling the inlet pressure to the pressure in the dome. The pilot pressure regulator (42, 142, 242) can be engaged in a slightly longer timeframe (e.g., within 1 second) as the pressure transducer 48 senses remaining pressure error (i.e., inlet versus setpoint pressure), and adjusts the pressure in the dome according to one of the methods described above. Changes in desired setpoint pressure can be accomplished within this 1 second time frame using this apparatus and process.

Figure 5:
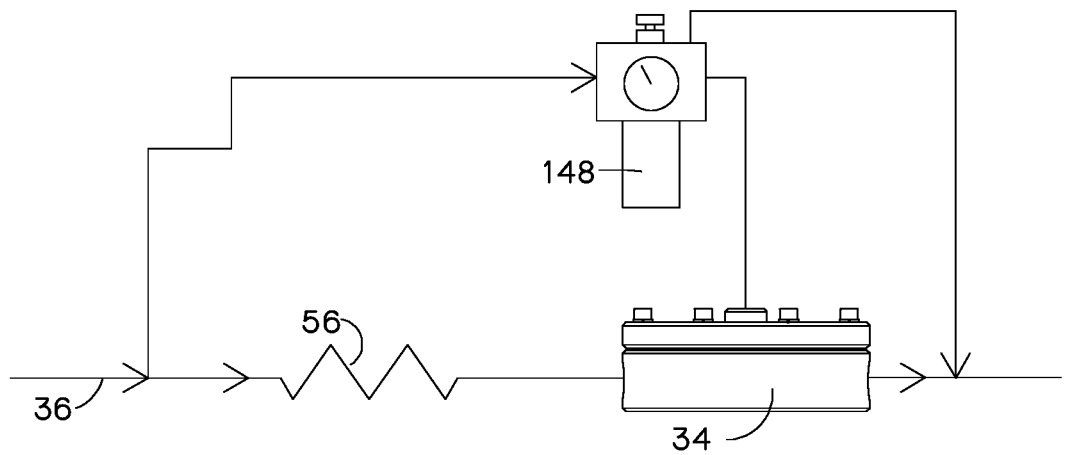
FIG. 5 is a schematic diagram of a dome-loaded diaphragm pressure regulator controlled by a mechanical pilot pressure regulator.
Figure 6:
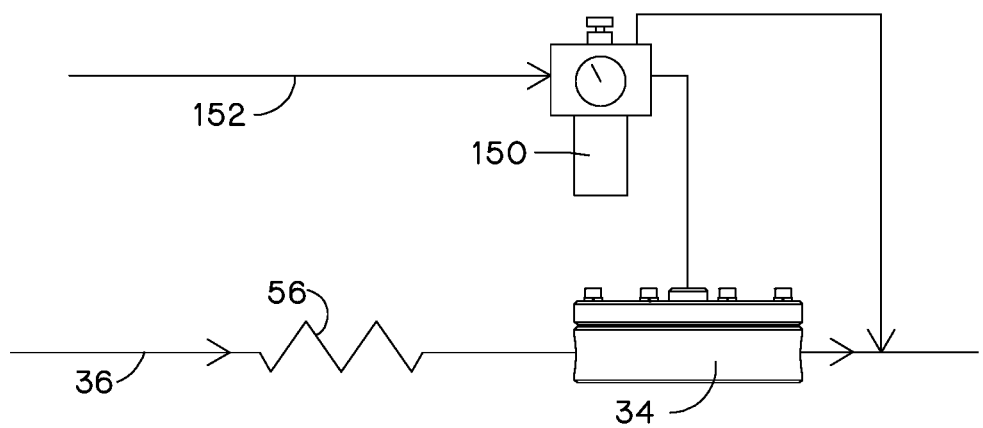
FIG. 6 is a schematic diaphragm of a dome-loaded diaphragm pressure regulator controlled by an alternative mechanical pilot pressure regulator.
Figure 7:
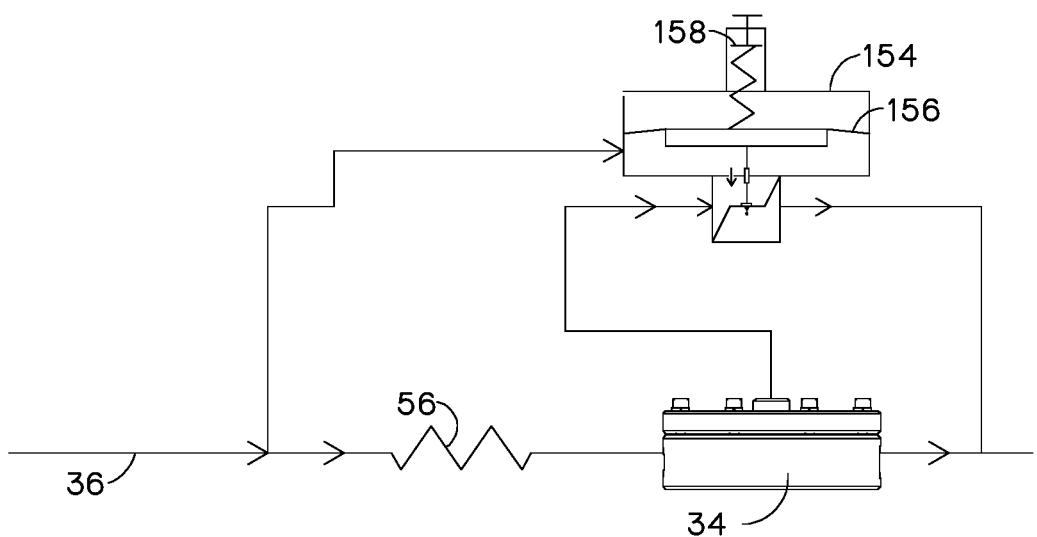
FIG. 7 is a schematic diaphragm of a dome-loaded diaphragm pressure regulator controlled by another alternative mechanical pilot pressure regulator.

Other types of pilot pressure regulators may be used in conjunction with the main pressure regulator 34 described above. Several examples are illustrated in FIGS. 5-7. FIG. 5 illustrates a commercially-available mechanical pressure reducing regulator used as a pilot pressure regulator 148 for supplying the pilot pressure to the dome of the main pressure regulator 34. In this example, pressure is tapped from the process line 36 just upstream of a flow restriction 56 which is in turn just upstream of the main pressure regulator 34. Fluid vented from the pilot pressure regulator 148 optionally may return to the process line 36 downstream of main pressure regulator 34.

FIG. 6 illustrates a commercially-available pressure reducing regulator 150 configured to tap fluid pressure from a line 152 connected to a point further upstream in the process, such as from the discharge of a compressor (not shown).

FIG. 7 illustrates a commercially-available closed-loop mechanical pressure controller 154 including a diaphragm 156 and adjustable preload spring 158 used as a pilot pressure regulator. In this configuration, a force balancing mechanism controls the pilot pressure (from process line 36) to the dome of the main pressure regulator 34 as necessary to control the upstream pressure at the desired setpoint.

Some refrigerants such as supercritical CO2 have demanding physical properties. The pilot pressure regulators described above may be configured to be compatible with these refrigerant, for example by the use of suitable component alloys, seal compositions, etc.

As discussed above, pressure regulation of two-phase or trans-critical fluids such as supercritical CO2 may be challenging. Accordingly, the dome-loaded diaphragm pressure regulator used as the main pressure regulator in the embodiments described above may be modified to improve performance with such fluids. More specifically, the dome-loaded direct sealing diaphragm pressure regulator may be configured in such a way to ensure that only vapor contacts the diaphragm within the dome. Ensuring that only vapor contacts the diaphragm will improve the precision and consistency of the pressure regulator.

Figure 8:
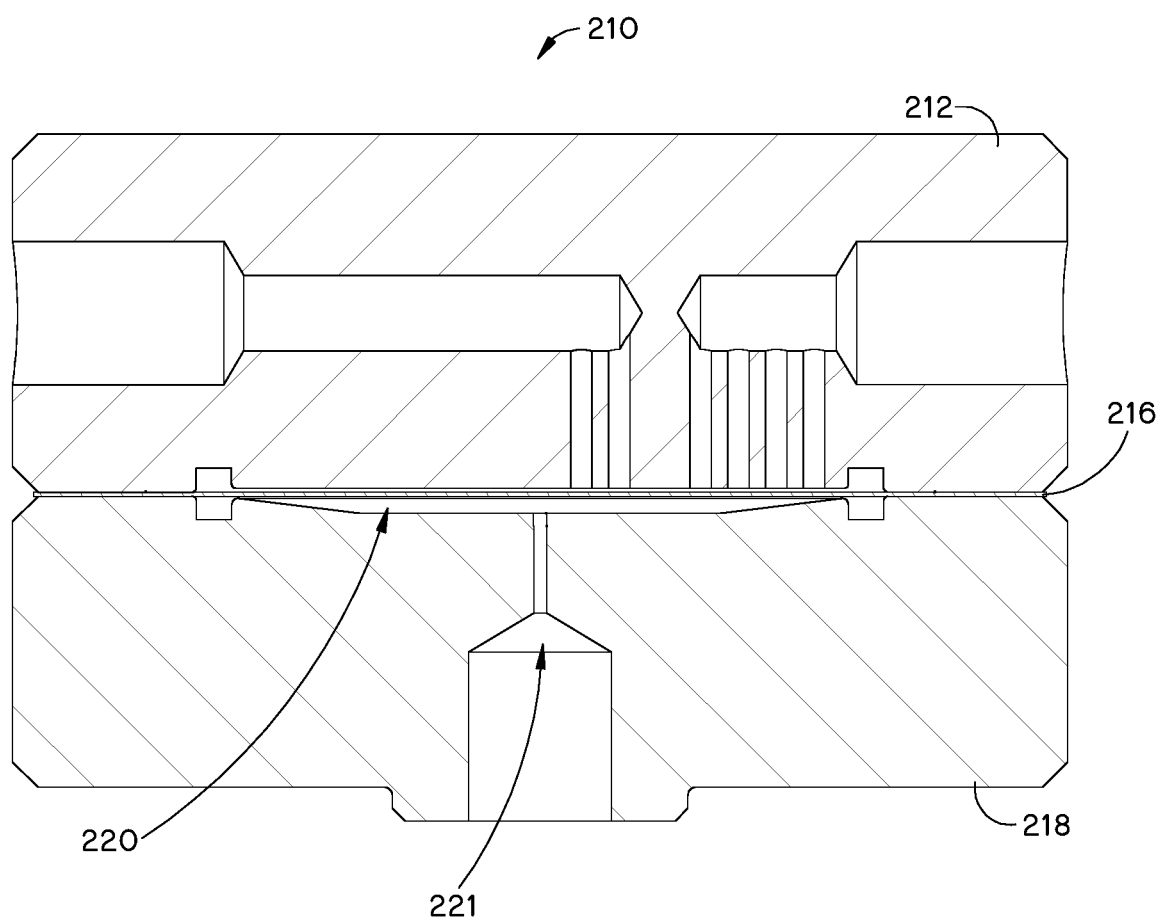
FIG. 8 is a schematic cross-sectional drawing of an exemplary dome-loaded diaphragm pressure regulator configured for operation in an inverted orientation.

For example, FIG. 8 illustrates a representative pressure regulator 210. This is substantially identical in basic construction to the pressure regulator 10 described above and includes a diaphragm 216 constrained between a body 212 and a reference housing 218. Collectively, a space defined between the diaphragm 216 and the reference housing 218 is referred to as a "dome" 220 of the pressure regulator 200. The pressure regulator 200 differs from the pressure regulator 200 in that it is oriented so that the dome 220 is vertically downwards or stated another way, such that the dome 220 is below the diaphragm 216 with respect to the local Earth vertical. This orientation is contrary to conventional practice in which the dome 220 would generally be placed above the diaphragm 216 in order to ensure good flow and drainage through the inlet and outlet. This orientation may be referred to as the pressure regulator 200 being "inverted". In this inverted orientation, the reference housing 218 defines a sump 221 which serves to segregate liquid from vapor such that only vapor contacts the diaphragm 216 within the dome 220.

Figure 9:
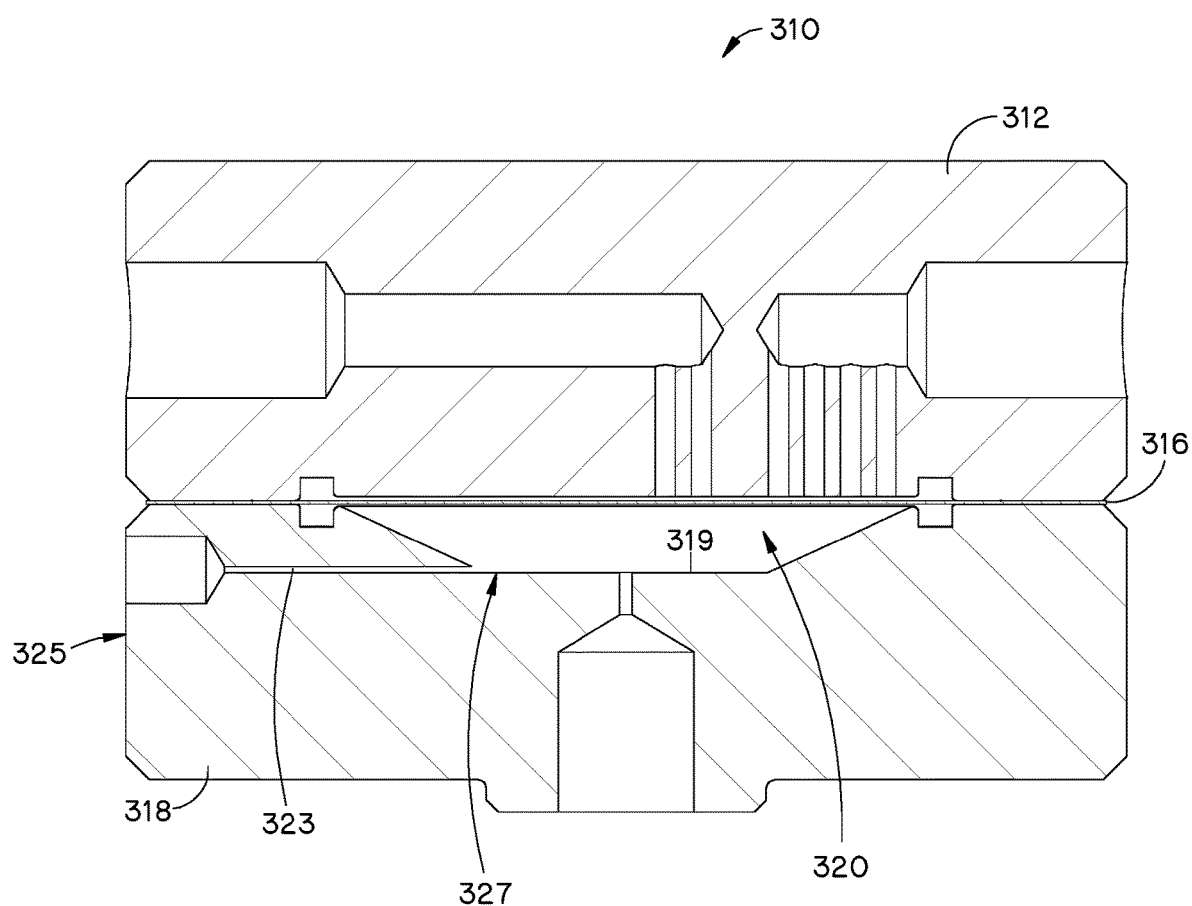
FIG. 9 is a schematic cross-sectional drawing of an exemplary dome-loaded diaphragm pressure regulator incorporating an internal capillary bypass line.

As another example, FIG. 9 illustrates an alternative pressure regulator 310. This is similar identical to the pressure regulator 210 described above and includes a diaphragm 316 constrained between a body 312 and the reference housing 318. Collectively, a space defined between the diaphragm 316 and the reference housing 318 is referred to as a "dome" 320 of the pressure regulator 300. The dome 320 is defined in part by a cavity 319 formed in the reference housing 318. An internal capillary passage 323 is formed in the reference housing 318 and communicates between an outer peripheral wall 325 of the reference housing 318 and a bottom wall 327 of the cavity 319. This capillary's function is twofold; it firstly allows for the circulation of fluid inside the dome to ensure that the dense liquid, congregating at the bottom of the dome 320, is flushed out. Secondly, it allows for continuous mass flow through the pilot regulator to provide pressure control stability. The inlet valve on the pilot regulator, e.g., item 44 in FIG. 2, will control in a less binary fashion since there is a continuous flow, ensuring that 44 never completely shuts off. The same is true for the outlet valve, e.g., item 46. The capillary helps ensure that the devices never fully seat, which improves pressure control.

In use, pressure regulator 310 would be oriented in an inverted orientation as described for the pressure regulator 210. This inverted orientation serves to segregate liquid from vapor such that only vapor contacts the diaphragm 316 within the dome 320. The internal capillary passage 323 would be connected to a vent line or downstream process line. An example bypass line 329 connecting the capillary passage 323 to the downstream process line is shown in FIG. 2. The internal capillary passage 323 provides a parallel bypass flow route so that liquid refrigerant can exit the dome 320 even if the valves of the pilot pressure regulator are closed. This is believed to be especially helpful in configurations where the pilot pressure regulator utilizes an outlet valve having a binary state.

Figure 10:
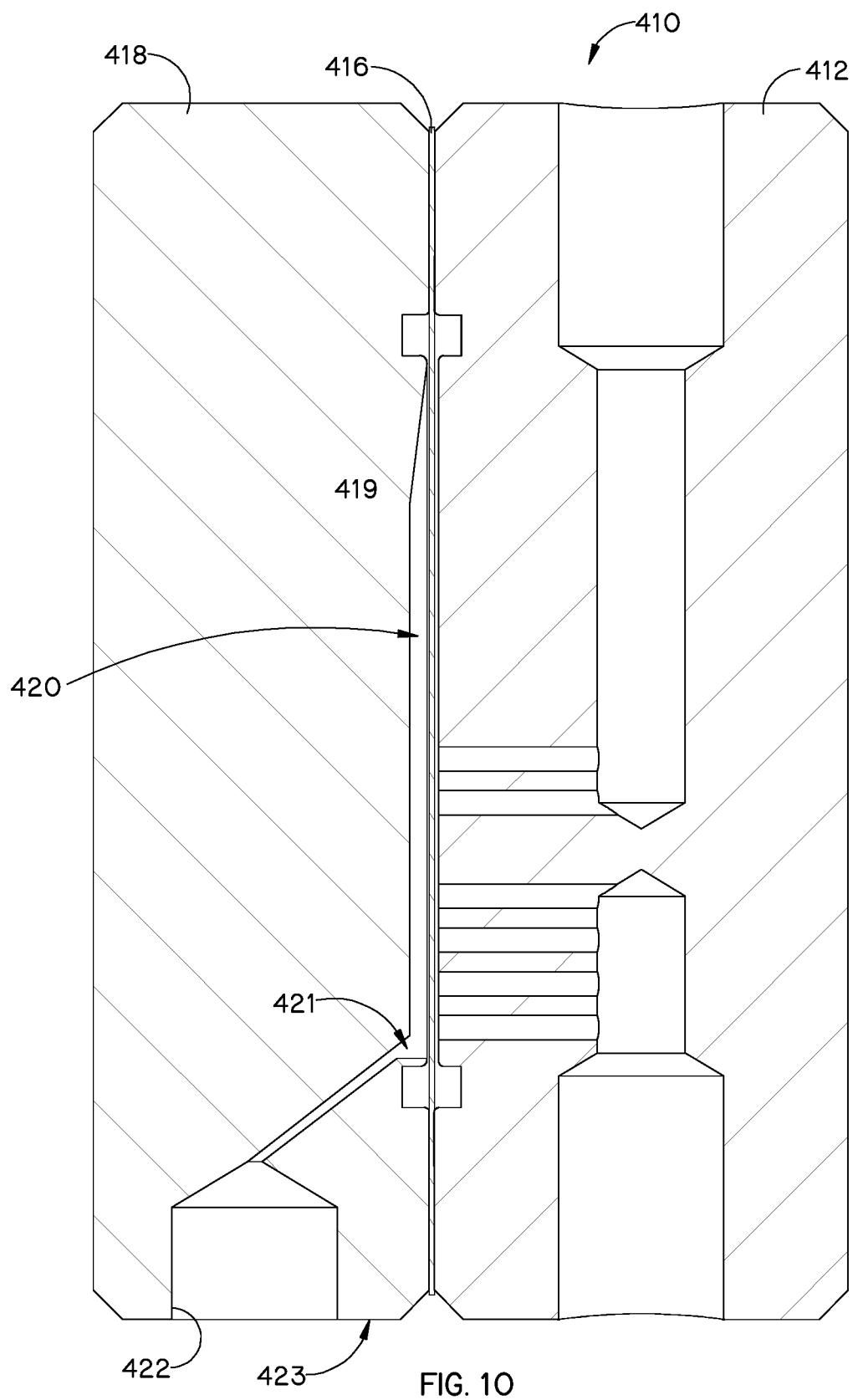
FIG. 10 is a schematic cross-sectional drawing of an exemplary dome-loaded diaphragm pressure regulator configured for operation in an arbitrary non-upright orientation.

As another example, FIG. 10 illustrates an alternative pressure regulator 410. This is similar identical to the pressure regulator 10 described above and includes a diaphragm 416 constrained between a body 412 and the reference housing 418. Collectively, a space defined between the diaphragm 416 and the reference housing 418 is referred to as a "dome" 420 of the pressure regulator 410. The dome 420 is defined in part by a cavity 419 formed in the reference housing 418. This cavity 419 is shaped so as to define a sump 421 of the dome 420. A reference port 422 is positioned outboard of the cavity 419, that is, between the cavity 419 and a peripheral wall 423 of the reference housing 418. Stated another way, the sump 421 is located asymmetrically with respect to the diaphragm 416. In use, the pressure regulator 410 would be oriented so that the sump 421 is vertically downwards or stated another way, such that the sump 421 is below the cavity 419 with respect to the local Earth vertical. This orientation serves to segregate liquid from vapor such that only vapor contacts the diaphragm 416 within the dome 420.

Any of the pressure regulators described above may benefit from the incorporation of heating to vaporize any liquid. This may be incorporated, for example, by placing an electric resistance heater in contact with the reference housing of the pressure regulator, or by circulating heated fluid through the pressure regulator. Another possibility might be providing a heating jacket for the inlet/outlet valves of the pilot pressure regulator to ensure fluid quality is constant inside the valve.

The pressure regulating apparatus described above utilizing a dome-loaded diaphragm pressure regulator in combination with a pilot pressure regulator energized by process fluid may be used to regulate pressure anywhere required in a fluid flow system. Examples of the incorporation of this pressure regulating apparatus into thermal fluid systems will be described with respect to FIGS. 11-13.

One possible use for the pressure regulating apparatus described above is for improved heat exchanger control in a refrigeration apparatus. Improved performance can be obtained by controlling both the mass flow through the evaporator and the evaporator pressure with the inclusion of a back pressure regulator after the evaporator. In addition, precise and immediate changes in heat transfer can be made by controlling the boiling temperature of the refrigerant by changing the saturation pressure setpoint of the back pressure regulator through automation. Temperature control of the process fluid is directly related to pressure control due to the fixed pressure/temperature relationship of all common refrigerants when evaporating or condensing during the vaporization process of fluid from liquid to gas. Temperature control is possible for heat exchangers due to the fact that when the fluid is in a saturated liquid/vapor mixture, as liquid boils off and enthalpy increase, fluid is approaching the vapor dome side on an isotherm. Thus, the temperature during this process is constant, which allows for control of temperature inside the heat exchanger via means of pressure control.

Figure 11:
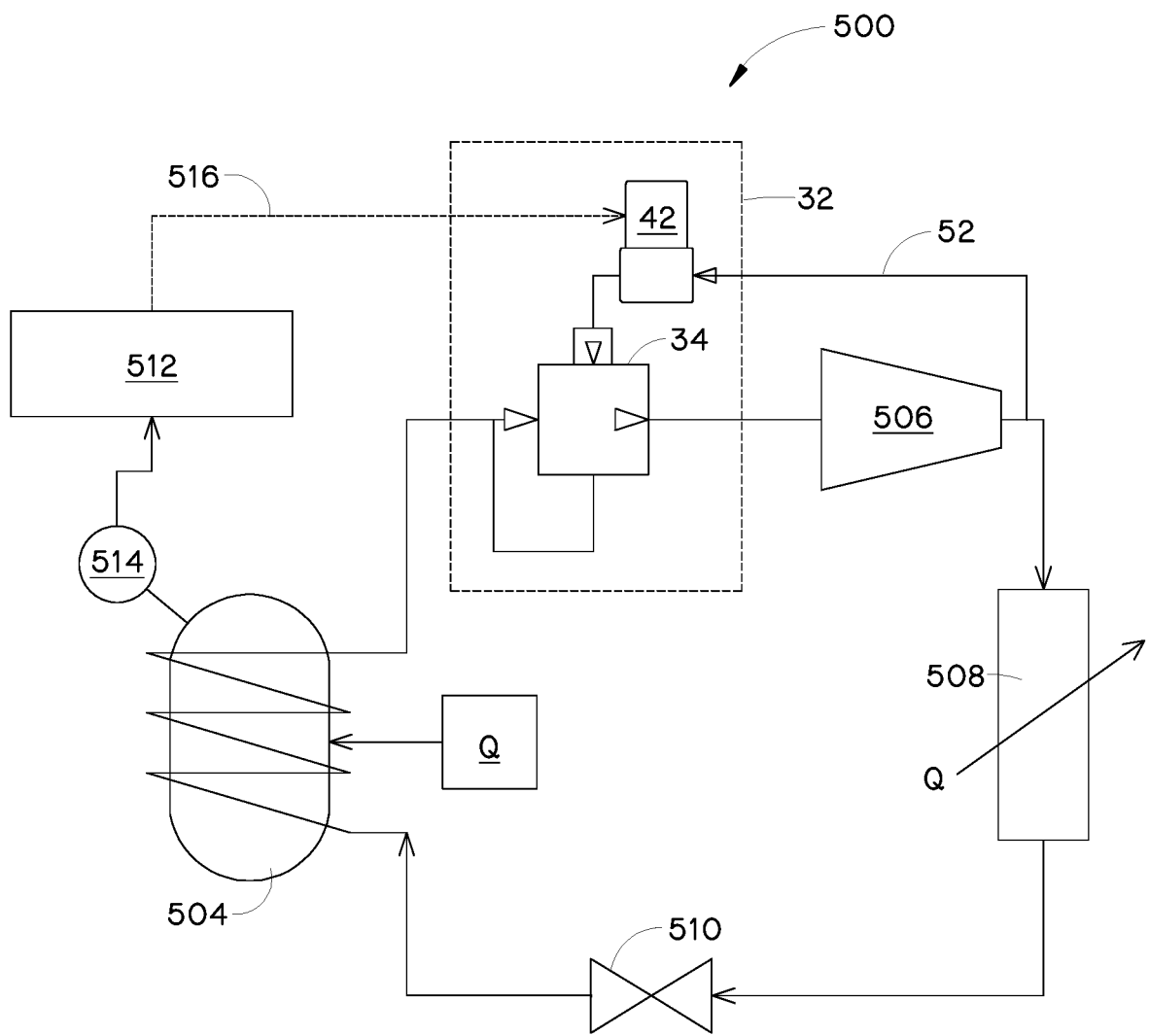
FIG. 11 is a schematic diagram of a refrigeration apparatus incorporating a pressure regulating apparatus that is energized by process fluid and configured to regulate pressure downstream of an evaporator.

FIG. 11 illustrates an exemplary closed loop refrigeration apparatus 500 that is operable to remove heat from a heat source. As used herein the term "heat source" refers to any device, system, or item of equipment which generates heat that needs to be removed. In FIG. 11 a heat source 502 is depicted schematically.

The refrigeration apparatus 500 fundamentally operates by providing a low-temperature liquid refrigerant to an evaporator 504 which is thermally coupled to the heat source 502. Boiling of the refrigerant within the evaporator 504 carries away heat energy. As used herein, structures which are "thermally coupled" to each other are configured and/or positioned such that they are capable of transferring heat energy between each other. The mode of heat transfer may be conduction, convection, radiation, or any combination thereof. For example, two mechanical elements in physical contact may be capable of heat transfer by direct conduction and thus would be considered "thermally coupled". As another example, two mechanical elements mutually exposed to fluid flow within a duct may be capable of heat transfer by convection, and thus would be considered "thermally coupled".

As used herein, the term "refrigerant" refers to any fluid capable of being effectively manipulated in the refrigeration apparatus 500 (e.g., stored, transported, compressed, valved, pumped, etc.) and of undergoing phase transitions from a liquid to a gas and back again. One of ordinary skill in the art may select a desired refrigerant to suit a particular application based on its physical properties. Nonlimiting examples of commercially available substances used as refrigerants include fluorocarbons, especially chlorofluorocarbons and hydrofluorocarbons, hydrocarbons (e.g., propane), ammonia, inert gases (e.g. nitrogen), and transcritical fluids such as supercritical carbon dioxide ($CO_2$).

It will be understood that the components of the refrigeration apparatus 500 are interconnected by appropriate conduits, pipes, valves, etc. as required to control the flow of refrigerant through the refrigeration apparatus 500. These connections may be shown schematically in the various figures, where conduits and/or pipes are represented by single lines. It will be understood that the term "in fluid communication" describes a connection between two or more components which permits a fluid (e.g. refrigerant) to flow therebetween.

The refrigeration apparatus 500 includes, in fluid flow sequence, a compressor 506, a condenser 508, a flow control valve 510, and the evaporator 504.

The compressor 506 comprises one or more devices operable to receive low-pressure refrigerant in the gas phase and compress it to a higher pressure. Nonlimiting examples of suitable compressors include scroll compressors, reciprocating piston compressors, and centrifugal compressors. The compressor may be driven by a prime mover such as an electric motor (not shown).

The condenser 508 comprises one or more devices operable to receive high-pressure refrigerant from the compressor 506 and remove heat from the refrigerant. In a two-phase system, operation of the condenser 508 causes the refrigerant to condense to a liquid. One nonlimiting example of a suitable device for the condenser 506 is a refrigerant to air heat exchanger.

The flow control valve (also referred to as an expansion valve or metering valve or TXV) 510 functions to meter the flow of liquid refrigerant. The flow control valve 510 may be mechanical, thermomechanical, or electromechanical in operation, and its control may be manual, automatic, or computer-controlled. The primary purpose and function of the flow control valve 510 is to modulate the cooling capacity of the refrigeration apparatus 500. Types of devices used for this purpose include, for example, porous plugs, capillary tubes, calibrated orifices, and valves.

The evaporator 502 is a type of heat exchanger which includes a first fluid flowpath or interface communicating with the refrigerant (referred to as a "first side") and a second fluid flowpath or interface communicating with the heat source 502 (referred to as a "second side").

A pressure regulating apparatus is located downstream of the evaporator 502 and configured so as to control the saturation pressure of the refrigerant within the evaporator 502. The pressure regulating apparatus includes a dome-loaded diaphragm pressure regulator, such as one of the diaphragm pressure regulators described above, in combination with a pilot pressure regulator, such as one of the diaphragm pressure regulators described above. It will be understood that the pressure regulating apparatus may include any of the configurations shown in FIGS. 2-7, utilizing any of the diaphragm pressure regulators illustrated in FIGS. 8-10. For purposes of description, FIG. 11 shows the pressure regulating apparatus 32 illustrated in FIG. 2, utilizing the main pressure regulator 34 and pilot pressure regulator 42. In the illustrated example a tap line 52 conducts refrigerant to the pilot pressure regulator 42 from a point just downstream of the exit of the compressor 504. The pressure at this point would generally be the highest or near the highest pressure in the system and provides the greatest amount of energy for operation of the pilot pressure regulator 42. It will be understood that the tap line 52 could be connected anywhere in the system upstream of the main pressure regulator 34.

FIG. 11 further illustrates a system controller 512 which is a type of electronic controller (e.g., PLC or general-purpose computer) operable to receive sensor inputs, execute control logic such as feedback and feedforward loops, and provide outputs controlling other portions of the refrigeration apparatus 500. In the illustrated example, a transducer 514 is provided which is operable to sense a physical property of the fluid in the evaporator 502 and produce a signal representative thereof. For example, the transducer 514 may be a temperature transducer or a pressure transducer. The output signal of the transducer 514 is provided as an input to the system controller 512. The system controller 512 is configured or programmed to execute control logic responsive to the transducer signal and to produce appropriate outputs. For example, the system controller 512 may produce an output 516 representative of a pressure setpoint which is provided to the pilot pressure controller 42.

Basic operation of the refrigeration apparatus 500 is as follows. The system is charged with refrigerant. Liquid refrigerant from the condenser 508 is provided to the flow control valve 510. The flow control valve 510 meters the flow of liquid refrigerant, reducing its pressure and temperature. The refrigerant then passes to the evaporator 504, where it absorbs heat from the heat source 502 and partially vaporizes.

The pressure regulating apparatus downstream of the evaporator 504 operates to control the saturation pressure of the mixture of liquid/vapor phase refrigerant within the evaporator 504 and thus maintain the saturation temperature of the refrigerant at a predetermined value. It may be used to maintain isothermal conditions in the evaporator 504. It is noted that the setpoint may vary depending on system conditions or operational needs.

The refrigerant exits the pressure regulating apparatus 512 and enters the compressor 506 where it is compressed to a high-pressure vapor. The vapor is passed to the condenser 508 where heat is rejected to the ambient environment or another suitable cold sink, causing the refrigerant to condense to liquid, and the cycle repeats.

It will be understood that the pressure regulating apparatus such as that illustrated in FIG. 11 can be incorporated at any location within the refrigeration apparatus 500. It could also be incorporated into other fluid systems requiring pressure control.

Another possible use for the pressure regulating apparatus described above is for condenser pressure control in a refrigeration apparatus. While the above example illustrated evaporator pressure control, the same considerations are applicable for condenser heat exchanger control. In the prior art, the same type of traditional regulators are used on condenser heat exchanger control, which slightly different control objectives. This application's main focus is to prevent compressor motor overload caused by excessive suction pressure, which could be a function of high or intermittent heat load, defrost cycles, or startup. The principle of control and operation as it relates to setpoint generation and modes of operation is the same.

Figure 12:
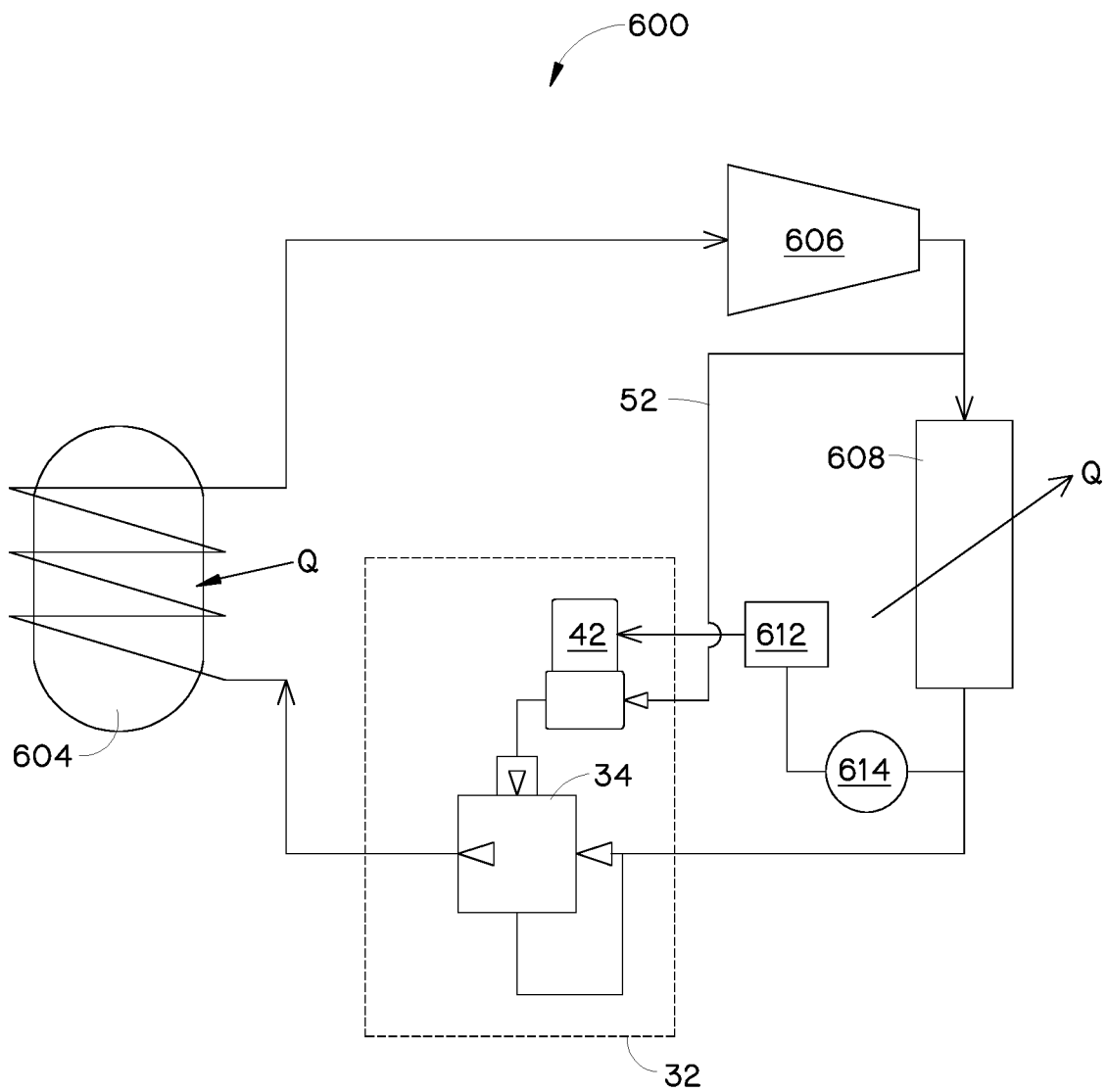
FIG. 12 is a schematic diagram of a refrigeration apparatus incorporating a pressure regulating apparatus that is energized by process fluid and configured to regulate pressure downstream of a condenser.

For example, FIG. 12 illustrates an exemplary closed loop refrigeration apparatus 600 that is operable to remove heat from a heat source. It is similar in construction and operation to the refrigeration apparatus 500 described above. Elements of the refrigeration apparatus 600 not explicitly described may be considered identical to the corresponding elements of refrigeration apparatus 500.

The refrigeration apparatus 600 includes, in fluid flow sequence, a compressor 606, a condenser 608, and an evaporator 604.

A pressure regulating apparatus is located downstream of the condenser 608 and configured so as to control the pressure of the refrigerant within the condenser 608. The pressure regulating apparatus includes a dome-loaded diaphragm pressure regulator, such as one of the diaphragm pressure regulators described above, in combination with a pilot pressure regulator, such as one of the diaphragm pressure regulators described above. It will be understood that the pressure regulating apparatus may include any of the configurations shown in FIGS. 2-7, utilizing any of the diaphragm pressure regulators illustrated in FIGS. 8-10. For purposes of description, FIG. 12 shows the pressure regulating apparatus 32 illustrated in FIG. 2, utilizing the main pressure regulator 34 and pilot pressure regulator 42. In the illustrated example a tap line 52 conducts refrigerant to the pilot pressure regulator 42 from a point just downstream of the exit of the compressor 606. It will be understood that the tap line 52 could be connected anywhere in the system upstream of the main pressure regulator 34.

FIG. 12 further illustrates a system controller 612 similar to controller 512 described above. In the illustrated example, a transducer 614 is provided which is operable to sense a physical property (e.g., pressure or temperature) of the refrigerant exiting the condenser 608 and produce a signal representative thereof. The system controller 612 is configured or programmed to control operation of the pilot pressure controller 42 based on the transducer input.

Yet another possible use for the pressure regulating apparatus described above is for flash gas bypass pressure control. "Flash gas bypass" is a relatively new method of enhancing the efficiency and output of a refrigeration cycle. This is becoming more known in transcritical $CO_2$ refrigeration. This method separates the gas and liquid in a flash tank, with the gas phase bypassing the evaporator and returning directly to the suction of the compressor. The pressure of the flash tank is effectively controlled by the flash gas bypass control valve, which allows the system designer to optimize system efficiency by controlling the pressure, temperature, and enthalpy conditions at the point of separation.

The control of the pressure in this tank is effectively a back pressure regulator application. This control has similar challenges to that of the evaporator heat exchanger control, namely that conventional linear control valves are slow to operate and the delay time of valve actuation causes resonate effects during system start-up, contributing to start-up times approaching 30 minutes.

Figure 13:
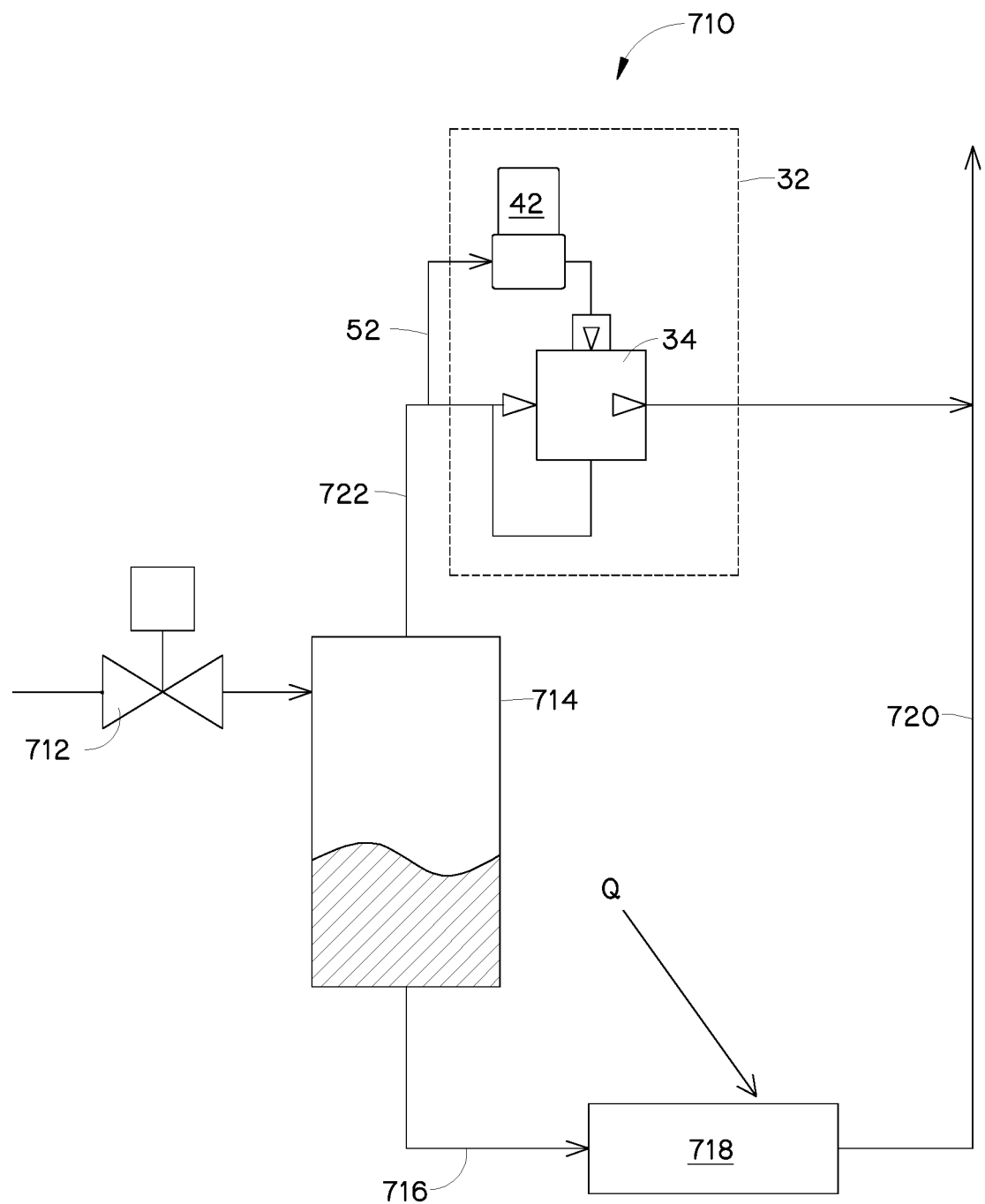
FIG. 13 is a schematic diagram showing an exemplary flash gas bypass system.

FIG. 13 illustrates an example of a flash gas bypass system 710 suitable for inclusion in a refrigeration apparatus described above. The system 710 includes a flow control valve 712 which discharges refrigerant to a flash tank 714. liquid and vapor refrigerant phases are separated in the flash tank 714 by gravity. Liquid refrigerant is discharged from a lower portion of the flash tank 714 through a line 716 to an evaporator 718. Vapor phase refrigerant exits the evaporator 718 and is routed through a suction line 720 back to a compressor (not shown). Gaseous refrigerant is discharged from an upper portion of the flash tank 714 through a bypass line 722 which rejoins the suction line 720.

A pressure regulating apparatus is located in the bypass line 722 downstream of the flash tank 714 and configured so as to control the saturation pressure of the refrigerant within the flash tank 714. The pressure regulating apparatus includes a dome-loaded diaphragm pressure regulator, such as one of the diaphragm pressure regulators described above, in combination with a pilot pressure regulator, such as one of the diaphragm pressure regulators described above. It will be understood that the pressure regulating apparatus may include any of the configurations shown in FIGS. 2-7, utilizing any of the diaphragm pressure regulators illustrated in FIGS. 8-10. For purposes of description, FIG. 13 shows the pressure regulating apparatus 32 illustrated in FIG. 2, utilizing the main pressure regulator 34 and pilot pressure regulator 42. In the illustrated example a tap line 52 conducts refrigerant to the pilot pressure regulator 42 from a point just downstream of the exit of the flash tank 714. It will be understood that the tap line 52 could be connected anywhere in the system upstream of the main pressure regulator 34, including, for example, at the discharge of a compressor connected to the system (not shown).

The pressure regulating apparatus and method described above has numerous advantages over prior art pressure regulating systems. The apparatus is self-contained. It responds rapidly at a response frequency well outside the range of other system controls but requires no external gas supply. Such a system could be targeted to control evaporator and condenser pressure to allow for improved system efficiency and maximization of heat exchanger efficiency and by tightly controlling phase change conditions throughout all surfaces in the heat exchanger.

Furthermore, the dome-loaded multiple outlet orifice back pressure regulator used as a main pressure regulator, requires much lower dP to operate because the design allows for extremely wide range of flow rate turndown. For example, for a given flow rate application, excellent control can be achieved with very low dP such as 2 psi, or even 1 psi at full system flow rate, while still providing excellent low flow control; some embodiments can demonstrate valve dP values of less than 1 psi, for example about 0.5 psi. These numbers directly relate to valve authority, showing a clear competitive advantage relative to prior art discussed above. This means that the fluid is not required to drop in pressure beyond the location of the back pressure regulator, which represents a minimal efficiency loss. Every unit of pressure that must be lost for stability represents additional energy required by the system to reach peak operating pressures. Thus, having a valve with minimum valve authority represents efficiency gain.

The foregoing has described apparatus and methods for self-energized pressure regulators. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A diaphragm pressure regulator, comprising:
    a body defining a process surface and including:
        an exhaust port having a discharge opening communicating with an exterior of the body, and at least one vent void in the process surface communicating with the exhaust port; and
        an inlet port having an inlet opening communicating with an exterior of the body, and at least one process void in the process surface communicating with the inlet port;
    a reference housing including a cavity defining a reference surface and a reference port in fluid communication with the cavity and an exterior of the reference housing; and
    a diaphragm having opposed reference and process sides disposed between the body and the reference housing such that the process side contacts the process surface, the diaphragm movable between a first position engaged with the at least one vent void, and a second position wherein the diaphragm is not engaged with the at least one vent void, wherein a dome is defined between the cavity and the reference side of the diaphragm, wherein the diaphragm pressure regulator is oriented such that the diaphragm extends in a vertical direction; and
    wherein the reference housing includes a sump configured to segregate liquid from the reference side of the diaphragm, wherein the sump is located asymmetrically with respect to the diaphragm.

2. The diaphragm pressure regulator of claim 1 wherein the cavity includes an internal capillary channel communicating with an exterior of the reference housing.

3. The diaphragm pressure regulator of claim 2 wherein the internal capillary passage communicates between an outer peripheral wall of the reference housing and a bottom wall of the cavity.

4. The diaphragm pressure regulator of claim 1 further comprising means for heating the reference housing so as to vaporize refrigerant therein.

5. The diaphragm pressure regulator of claim 1 wherein the diaphragm seals directly against multiple vent voids.

6. The diaphragm pressure regulator of claim 1 wherein the diaphragm seals directly against multiple process voids.

7. The diaphragm pressure regulator of claim 1 in combination with a thermal system, the thermal system including:
    a compressor, a condenser, a flow control valve, and at least one heat exchanger connected in a closed fluid loop charged with refrigerant, wherein the diaphragm pressure regulator is connected in fluid communication with the closed fluid loop;
    a pilot pressure regulator coupled in fluid communication with the dome of the diaphragm pressure regulator, the pilot pressure regulator configured to receive the refrigerant and to provide the refrigerant to the dome at a setpoint pressure;
    a tap line communicating the refrigerant to the pilot pressure regulator, from a point in the fluid loop upstream of the main pressure regulator; and
    a flowpath communicating the tapped refrigerant back to the fluid loop at a point downstream of the main pressure regulator.

8. The combination of claim 7 wherein the pilot pressure regulator includes a binary state outlet valve.

9. The combination of claim 7 wherein:
the thermal system includes an evaporator connected in series in the closed fluid loop; and
the diaphragm pressure regulator is configured to control an outlet pressure of the evaporator.

10. The combination of claim 7 wherein the diaphragm pressure regulator is configured to control an outlet pressure of the condenser.

11. The combination of claim 7 wherein the diaphragm pressure regulator is configured to maintain isothermal conditions within the at least one heat exchanger by controlling refrigerant saturation pressure.

12. The combination of claim 7 wherein:
The thermal system includes a flash gas bypass tank; and
the diaphragm pressure regulator is configured to control refrigerant pressure in the flash gas bypass tank.

13. The combination of claim 7 where the pilot pressure regulator includes a fill valve and a drain valve.

14. The combination of claim 13 wherein the fill and drain valves are binary state valves.

15. The combination of claim 7 wherein the pilot pressure regulator includes a fill valve and a fixed drain orifice.

16. The combination of claim 7 wherein the pilot pressure regulator includes a fixed fill orifice and a drain valve.

* * * * *